April 24, 1928. 1,666,956

E. A. BEYL

FRICTION CLUTCH

Filed June 17, 1927

Inventor
Emil A. Beyl
By his Attorneys
Merchant and Kilgore

Patented Apr. 24, 1928.

1,666,956

UNITED STATES PATENT OFFICE.

EMIL A. BEYL, OF MINNEAPOLIS, MINNESOTA.

FRICTION CLUTCH.

Application filed June 17, 1927. Serial No. 199,502.

My invention relates to friction clutches, and is in the nature of an improvement on the friction clutch disclosed and broadly claimed in my United States Letters Patent #1,516,138, of date November 18, 1924, and to this end it consists of the novel devices and combinations of devices hereinafter described and defined in the claims.

In the accompanying drawings, which illustrate the invention, like characters indicate like parts throughout the several views.

Referring to the drawings.

Figure 1:
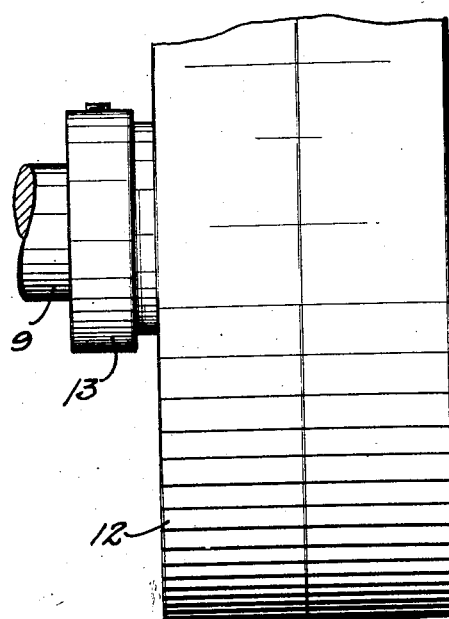
Fig. 1 is a fragmentary view partly in elevation and partly in section of a friction clutch having the invention embodied therein.

Of the parts of the friction clutch heretofore referred to it is important to note the disc 4 having a composition member 5 secured to each face thereof and mounted between a fixed clamping flange 6 and a cooperating movable clamping flange 7. The clamping flange 6 is integrally formed with a hub 8 keyed to a shaft 9, and the clamping flange 7 is loose on said hub. The disc 4 is mounted in a holder 10 for common turning movement therewith, but with freedom for axial floating movement in respect thereto. The holder 10 is rigidly secured by a spider 11 to the hub of a pulley 12, loose on the shaft 9. A stop collar 13 on the shaft 9 affords a base of resistance for said pulley 12 under the setting action of the clutch.

Figure 2:
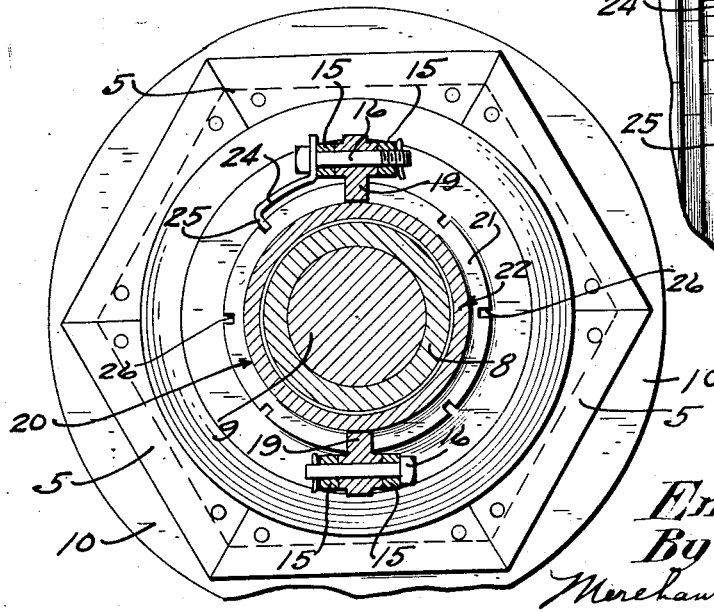
Fig. 2 is a view partly in end elevation and partly in transverse section taken on the line 2—2 of Fig. 1.
Figure 3:
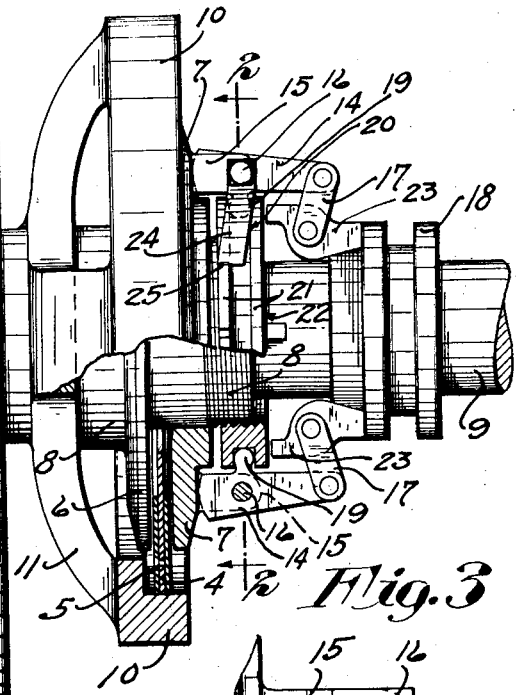
Fig. 3 is a fragmentary detail view of the invention as shown in Fig. 1, on an enlarged scale.
Figure 3:
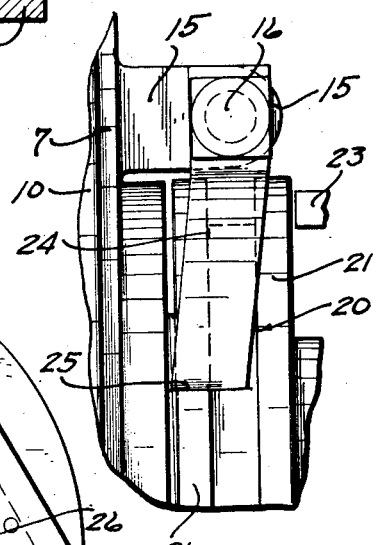

For operating the clamping flange 7 to set the clutch, there is provided a pair of diametrically opposite clutch dogs 14 in the form of short levers mounted between pairs of ears 15 on the clamping flange 7 and intermediately pivoted thereto by bolts 16. By reference to Fig. 2, it will be noted that the bolts 16 have screw-threaded engagement with one of the ears 15 of each pair and are further secured by cotter pins. The outer or long ends of the clutch dogs 14 are connected by links 17 to a shipper collar 18 on the shaft 9.

Formed with the clutch dogs 14 at the intermediate portions thereof are fulcrum lugs 19 which extend into a peripheral channel 20 formed between inner and outer flanges 21 on a collar 22, having screwthreaded engagement with the outer end of the hub 8. Stops 23 on the shipper collar 18 are arranged to engage the collar 22 and limit the axial movement of the shipper collar 18 toward the clutch.

By axially adjusting the collar 22 in respect to the clamping flange 7, the clutch dogs 14 may be set different distances from the clamping flange 7 so that they will move said clamping flange with a greater or less force to clamp the disc 4 between the clamping flanges 6 and 7.

The parts thus far referred to are fully described in my prior patent heretofore identified.

The invention provides means for holding the collar 22 where set in different rotated positions, is in the form of a spring finger 24 anchored by one of the bolts 16 to the clamping flange 7, and has at its free end a lock detent 25 arranged to enter one a plurality of circumferentially spaced lock notches 26 formed in the inner flange 21 of the collar 22. The inner end portion of the spring finger 24 is bent laterally and has an aperture through which the respective bolt 16 projects and is frictionally clamped between the head of said bolt 16 and the adjacent ear 15 (see Fig. 2). The spring finger 24 extends circumferentially around the periphery of the inner flange 21, and its lock detent 25 extends radially inward in respect to the collar 22. It will thus be noted that when the lock detent 25 is in one of the lock notches 26 it extends between the hub of the clamping flange 7 and the outer flange 21 on the collar 22. It will also be noted that the width of the lock detent 25 is such that it cannot shift edgewise between the hub of the clamping flange 7 and the outer flange 21 sufficiently to cause the lock finger 24 to turn on the respective bolt 16 and thereby prevent said lock detent from moving endwise out of the engaged lock notch 26.

To release the lock detent 25 from the engaged lock notch 26 so that the collar 22 may be rotatively adjusted, it is only necessary to insert a screw driver or other tool under the spring finger 24 and spring the same outward sufficiently to withdraw said lock detent from the engaged lock notch 26. With the lock detent 25 thus released, the same may be held until the collar 22 has been rotated sufficiently to carry the respective lock notch 26 out of registration with the lock detent 25, and then released and allowed to rest on the periphery of the inner flange 21 so that it will be projected into the next lock notch 26 upon the rotation of the collar 22.

What I claim is:

1. In a clutch, an axially movable clutch-setting member, a collar adjustable in respect to said member by a rotary movement and having inner and outer peripheral flanges and a plurality of circumferentially spaced lock notches in said inner flange, a spring finger, and a bolt extending through an aperture in the spring finger and anchoring the same to said member, said spring finger having a lock detent arranged to enter any one of said lock notches, said lock detent being held by the clutch-setting member and collar against endwise movement to prevent the same from moving out of the engaged lock notch.

2. In a clutch, an axially movable clutch-setting member, a collar adjustable in respect to said member by a rotary movement and having inner and outer peripheral flanges and a plurality of circumferentially spaced lock notches in said inner flange, a pair of ears on said member, a bolt extending through aligned apertures in said ears, a clutch-setting dog extending between the ears and pivoted on said bolt, said dog having a fulcrum lug extending into the channel between said flanges, and a spring finger having an apertured laterally bent end portion through which said bolt extends, said spring finger being frictionally clamped between the head of the bolt and the adjacent ear and having at its free end a laterally projecting lock detent arranged to enter any one of said lock notches, said lock detent being held by the clutch-setting member and collar against endwise movement to prevent the same from moving out of the engaged lock notch.

In testimony whereof I affix my signature.

EMIL A. BEYL.